United States Patent
Boyl-Davis et al.

(10) Patent No.: US 7,488,144 B2
(45) Date of Patent: Feb. 10, 2009

(54) METHODS AND APPARATUS FOR TRACK MEMBERS HAVING A NEUTRAL-AXIS RACK

(75) Inventors: Theodore M. Boyl-Davis, Snohomish, WA (US); James N. Buttrick, Jr., Seattle, WA (US); Roger A. Gage, Marysville, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 126 days.

(21) Appl. No.: 10/606,625

(22) Filed: Jun. 25, 2003

(65) Prior Publication Data

US 2004/0265078 A1    Dec. 30, 2004

(51) Int. Cl.
*B23B 35/00* (2006.01)

(52) U.S. Cl. .......................... 408/1 R; 408/77; 408/79; 408/88; 408/234; 409/178

(58) Field of Classification Search ................ 408/1 R, 408/76, 77, 78, 79, 88, 234, 103, 235; 409/175, 409/178, 235, 179, 132; 74/29, 30, 457, 74/109, 422

See application file for complete search history.

(56) References Cited

U.S. PATENT DOCUMENTS

| | | | |
|---|---|---|---|
| 1,676,206 A | 7/1928 | Ratliff | |
| 1,741,044 A | 12/1929 | Whipple et al. | |
| 2,151,205 A | 3/1939 | Hawn | |
| RE21,795 E | 5/1941 | Verderber | |
| 2,360,942 A | 10/1944 | Ellerstein | |
| 2,911,860 A | 11/1959 | Winslow et al. | |
| 2,922,323 A | 1/1960 | Weidner | |
| 2,946,246 A | 7/1960 | Allan | |
| 2,963,927 A | 12/1960 | Hanger | |
| 3,156,126 A | * 11/1964 | Olsen | 474/153 |
| 3,226,027 A | * 12/1965 | Cable et al. | 238/1 |
| 3,348,248 A | 10/1967 | Milkert | |
| 3,456,738 A | 7/1969 | Harry | |
| 3,575,364 A | 4/1971 | Frederick | |
| 3,592,095 A | 7/1971 | Passa et al. | |
| 3,599,958 A | 8/1971 | Schindler | |
| 3,627,436 A | * 12/1971 | Adams et al. | 408/63 |
| 3,633,433 A | * 1/1972 | Schurch | 74/415 |
| 3,663,115 A | 5/1972 | Vindez et al. | |
| 3,732,608 A | 5/1973 | Knopf | |
| 3,772,930 A | * 11/1973 | Lamport et al. | 474/153 |
| RE28,121 E | * 8/1974 | Gulley | 173/32 |

(Continued)

FOREIGN PATENT DOCUMENTS

DE    19834702 A1    2/2000

(Continued)

*Primary Examiner*—Daniel W Howell

(57) ABSTRACT

Methods and apparatus for track members having a neutral axis rack are disclosed. In one embodiment, an apparatus for supporting a manufacturing tool relative to a workpiece includes a track assembly adapted to be attached to the workpiece and including at least one rail, the rail having a longitudinally-extending neutral axis and a rack extending along a pitch line that at least approximately coincides with the longitudinally-extending neutral axis. In alternate embodiments, the rack includes a plurality of wedge-shaped apertures or a plurality of conically-shaped apertures.

43 Claims, 4 Drawing Sheets

U.S. PATENT DOCUMENTS

| | | | |
|---|---|---|---|
| 3,851,536 A * | 12/1974 | Zeldman | 474/148 |
| 3,874,244 A * | 4/1975 | Rasmussen et al. | 74/30 |
| 3,878,734 A * | 4/1975 | Zeldman et al. | 474/205 |
| 3,935,985 A | 2/1976 | Prudhomme et al. | |
| 3,990,689 A | 11/1976 | Eklund, Sr. | |
| 4,025,218 A | 5/1977 | Logan et al. | |
| 4,031,931 A | 6/1977 | Balcombe | |
| 4,091,712 A | 5/1978 | Geiger | |
| 4,123,187 A | 10/1978 | Turner | |
| 4,149,822 A | 4/1979 | Lehmkuhl | |
| 4,179,231 A | 12/1979 | Hadden | |
| 4,268,949 A | 5/1981 | Sato | |
| 4,324,514 A | 4/1982 | Craven | |
| 4,353,308 A | 10/1982 | Brown | |
| 4,388,890 A | 6/1983 | Wester et al. | |
| 4,396,318 A | 8/1983 | Jensen et al. | |
| 4,468,159 A | 8/1984 | Oster | |
| 4,520,684 A * | 6/1985 | Meyer et al. | 74/89.21 |
| 4,561,814 A | 12/1985 | Dahlgren, Jr. et al. | |
| 4,570,542 A | 2/1986 | Cable et al. | |
| 4,591,301 A | 5/1986 | Pelfrey | |
| 4,599,018 A | 7/1986 | Woods | |
| 4,686,397 A | 8/1987 | Becker | |
| 4,720,897 A | 1/1988 | Orrell et al. | |
| 4,740,117 A | 4/1988 | Schaff Deleury et al. | |
| D297,144 S | 8/1988 | Kazlauskas | |
| 4,761,876 A | 8/1988 | Kosmowski | |
| 4,778,317 A | 10/1988 | Earle, III et al. | |
| 4,787,786 A | 11/1988 | Freud et al. | |
| 4,818,154 A | 4/1989 | Bye et al. | |
| 4,850,763 A | 7/1989 | Jack et al. | |
| 4,932,814 A | 6/1990 | York | |
| 4,958,967 A | 9/1990 | Adachi | |
| 5,032,051 A | 7/1991 | Gilmore | |
| 5,062,746 A | 11/1991 | Deremo | |
| 5,070,792 A | 12/1991 | Harris | |
| 5,072,948 A | 12/1991 | Kostrzewski | |
| 5,129,865 A * | 7/1992 | Brock et al. | 474/152 |
| 5,173,015 A | 12/1992 | Maynard | |
| 5,297,907 A | 3/1994 | Strait et al. | |
| 5,323,962 A | 6/1994 | Jassby et al. | |
| 5,348,429 A | 9/1994 | Pfister | |
| 5,352,069 A | 10/1994 | Rourke | |
| 5,383,751 A | 1/1995 | Wheetley et al. | |
| 5,390,557 A * | 2/1995 | Tsukada | 74/89.17 |
| 5,395,187 A | 3/1995 | Slesinski et al. | |
| 5,403,133 A | 4/1995 | Kim | |
| 5,437,580 A * | 8/1995 | Doring | 474/153 |
| 5,445,478 A | 8/1995 | Ordogh et al. | |
| 5,468,099 A | 11/1995 | Wheetley et al. | |
| 5,477,597 A | 12/1995 | Catania et al. | |
| 5,482,411 A | 1/1996 | McGlasson | |
| 5,537,927 A | 7/1996 | Rogovein et al. | |
| 5,542,796 A | 8/1996 | Bratten et al. | |
| 5,573,076 A | 11/1996 | McCannon, Jr. | |
| 5,582,067 A * | 12/1996 | Snider | 74/109 |
| 5,609,444 A | 3/1997 | Valsecchi | |
| 5,613,810 A | 3/1997 | Bureller | |
| 5,661,892 A | 9/1997 | Catania et al. | |
| 5,664,311 A | 9/1997 | Banks et al. | |
| 5,697,413 A | 12/1997 | Fuller | |
| 5,934,848 A | 8/1999 | Hamalainen | |
| 6,007,278 A | 12/1999 | Arsenault | |
| 6,036,409 A | 3/2000 | Rissler | |
| 6,073,326 A | 6/2000 | Banks et al. | |
| 6,099,213 A | 8/2000 | Kammeraad et al. | |
| 6,210,084 B1 | 4/2001 | Banks et al. | |
| 6,220,099 B1 | 4/2001 | Marti et al. | |
| 6,240,332 B1 | 5/2001 | Buttrick et al. | |
| 6,283,684 B1 | 9/2001 | Jarvis | |
| 6,309,145 B1 | 10/2001 | Tremblay et al. | |
| 6,334,745 B1 | 1/2002 | Bennett, Sr. | |
| 6,357,101 B1 | 3/2002 | Sarh et al. | |
| 6,378,197 B1 | 4/2002 | Hansen | |
| 6,382,889 B1 | 5/2002 | Brown et al. | |
| 6,413,022 B1 | 7/2002 | Sarh | |
| 6,428,452 B1 | 8/2002 | Dahlstrom et al. | |
| 6,428,453 B1 | 8/2002 | Hoppe et al. | |
| 6,430,796 B1 | 8/2002 | Jones et al. | |
| 6,439,813 B1 | 8/2002 | Repossini | |
| 6,467,385 B1 | 10/2002 | Buttrick et al. | |
| 6,494,307 B1 | 12/2002 | Kozak et al. | |
| 6,505,393 B2 | 1/2003 | Stoewer et al. | |
| 6,547,496 B2 | 4/2003 | Chun et al. | |
| 6,550,129 B1 | 4/2003 | Buttrick, Jr. | |
| 6,575,673 B2 | 6/2003 | Born | |
| 6,612,792 B2 | 9/2003 | Barclay | |
| 6,634,838 B2 * | 10/2003 | Kitamura et al. | 409/235 |
| 6,796,014 B2 | 9/2004 | Sarh | |
| 6,843,328 B2 * | 1/2005 | Boyl-Davis et al. | 173/32 |
| 6,855,099 B2 | 2/2005 | Hazlehurst et al. | |
| 6,902,362 B2 | 6/2005 | Ferrari et al. | |
| 6,916,141 B2 | 7/2005 | Owen | |
| 6,926,094 B2 | 8/2005 | Arntson et al. | |
| 2002/0001511 A1 | 1/2002 | Reguzzi | |
| 2002/0127069 A1 * | 9/2002 | Luigi | 408/35 |
| 2002/0168241 A1 | 11/2002 | David et al. | |
| 2003/0207742 A1 | 11/2003 | Hazlehurst et al. | |
| 2004/0076484 A1 | 4/2004 | Alam et al. | |
| 2004/0234352 A1 * | 11/2004 | Vanderpol et al. | 409/178 |
| 2004/0245879 A1 | 12/2004 | Hirzel et al. | |
| 2005/0158134 A1 | 7/2005 | Roders | |

FOREIGN PATENT DOCUMENTS

| | | |
|---|---|---|
| JP | 55-120910 | 9/1980 |
| JP | 5828442 | 2/1983 |
| JP | 64-64711 | 3/1989 |
| JP | 401064711 | 3/1989 |
| JP | 1-210207 | 8/1989 |
| JP | 5318215 | 12/1993 |
| JP | 05318218 | 12/1993 |

* cited by examiner

METHODS AND APPARATUS FOR TRACK MEMBERS HAVING A NEUTRAL-AXIS RACK

CROSS REFERENCE TO RELATED APPLICATIONS

This patent application is related to co-pending, commonly-owned U.S. patent application Ser. No. 10/016,524 entitled "Flexible Track Drilling Machine" filed Dec. 10, 2001, and to the following concurrently-filed, commonly-owned U.S. patent applications: "Methods and Apparatus for Counterbalance-Assisted Manufacturing Operations", "Apparatus and Methods for Manufacturing Operations Using Opposing-Force Support Systems", "Apparatus and Methods for Manufacturing Operations Using Non-Contact Position Sensing", and "Apparatus and Methods for Servo-Controlled Manufacturing Operations".

FIELD OF THE INVENTION

The present disclosure relates to methods and apparatus for track members having a neutral axis rack, and more specifically, to flexible rails having an integrally-formed, neutral axis rack.

BACKGROUND OF THE INVENTION

The fabrication of large structures may involve the performance of a large number of manufacturing operations on the structure, such as the drilling of a large number of holes. Conventional structures that require a large number of manufacturing operations include, for example, aircraft, missiles, ships, railcars, sheet metal buildings, and other similar structures. In particular, conventional aircraft fabrication processes typically involve the drilling of a large number of holes in fuselage sections of the aircraft to allow these sections to be attached to each other and to the airframe.

A variety of devices have been developed to facilitate drilling operations involving the drilling of a large number of holes. For example, U.S. Pat. No. 4,850,763 issued to Jack et al. teaches a drilling system that includes a pair of rails temporarily attached to an aircraft fuselage. A support carriage is slideably coupled to the rails and supports a drill assembly. A template attached to the aircraft fuselage provides an indication of the desired locations of the holes that are to be formed in the aircraft fuselage. As the carriage is moved along the rails, a locking mechanism (or trigger) interacts with the template to securely position the carriage for a subsequent drilling operation.

Although desirable results have been achieved using prior art systems, there is room for improvement. For example, the ability to accurately position a manufacturing tool over a workpiece may be compromised when the structure is contoured. This is particularly true when the structure is a complex contoured structure that is curved in multiple planes of curvature. Because position accuracy may be reduced, manufacturing operations on such structures may require increased delays due to a need for increased checking and adjusting of the position of the manufacturing tool, and may also require additional repairs and reworking of the workpiece due to inaccuracies in the manufacturing operations. Thus, the foregoing reasons, an unmet need exists for an improved support assembly for performing manufacturing operations, including drilling operations.

SUMMARY OF THE INVENTION

The present invention is directed to methods and apparatus for track members having a neutral axis rack, and more specifically, to flexible rails having an integrally-formed, neutral axis rack. Apparatus and methods in accordance with the present invention may advantageously improve the position control of a manufacturing tool, thereby improving the accuracy, consistency, efficiency, and throughput of the manufacturing operation.

In one embodiment, an apparatus for supporting a manufacturing tool relative to a workpiece includes a track assembly adapted to be attached to the workpiece and including at least one rail, the rail having a longitudinally-extending neutral axis and a rack extending along a pitch line that at least approximately coincides with the longitudinally-extending neutral axis. In alternate embodiments, the rack includes a plurality of wedge-shaped apertures or a plurality of conically-shaped apertures.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and apparatus for track members having a neutral axis rack. Many specific details of certain embodiments of the invention are set forth in the following description and in FIGS. 1-7 to provide a thorough understanding of such embodiments. One skilled in the art, however, will understand that the present invention may have additional embodiments, or that the present invention may be practiced without several of the details described in the following description.

Figure 1:
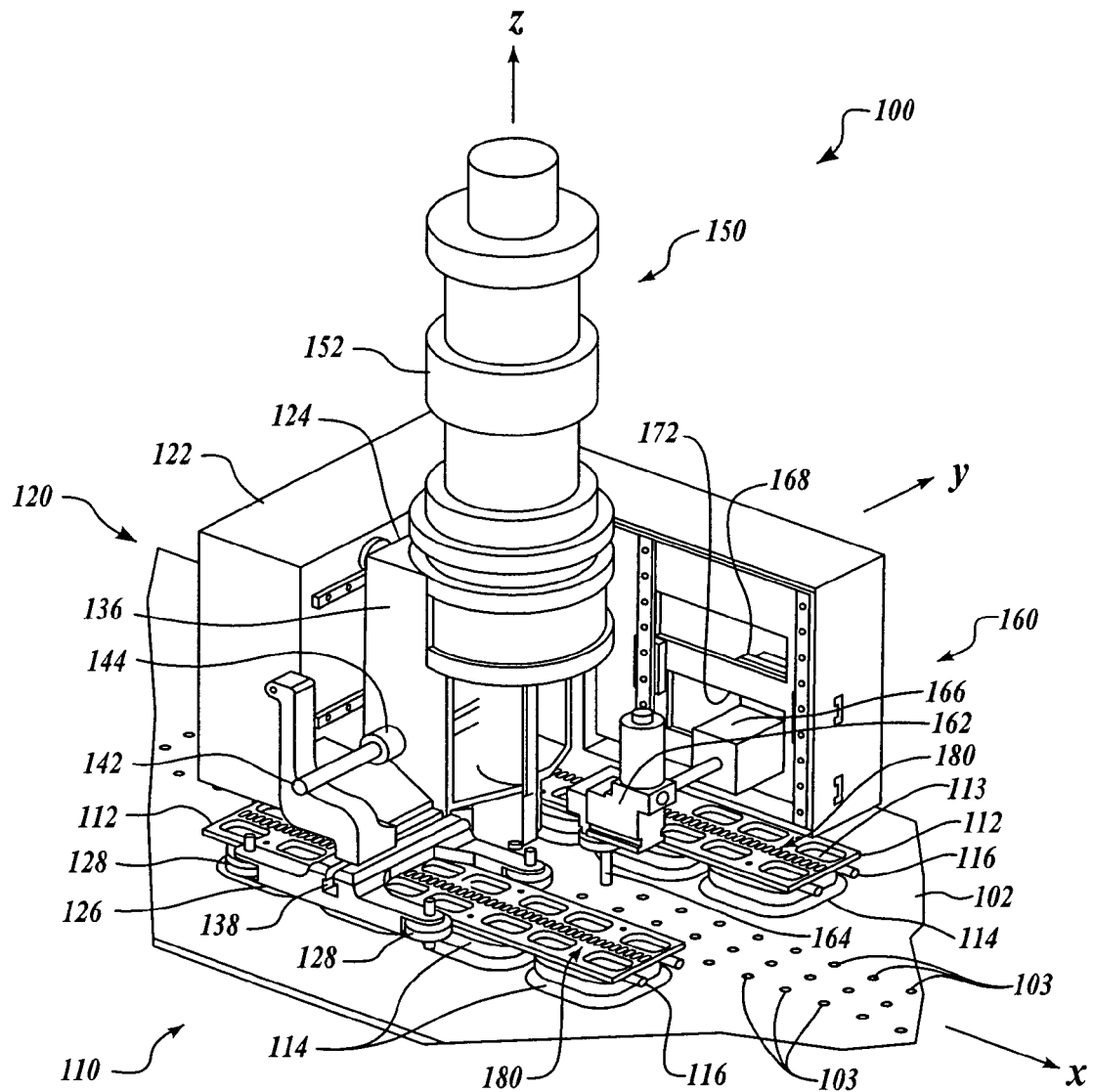
FIG. 1 is a front isometric view of a manufacturing assembly including a track assembly having an integrally-formed rack in accordance with an embodiment of the invention.

FIG. 1 is a front isometric view of a manufacturing assembly 100 for performing manufacturing operations on a workpiece 102 in accordance with an embodiment of the invention. In this embodiment, the manufacturing assembly 100 includes a track assembly 110 attachable to the workpiece 102, and a carriage assembly 120 moveably coupled to the track assembly 110. A tool assembly 150 (e.g. a drilling assembly) is operatively coupled to the carriage assembly 120 such that the tool assembly 150 may be engaged with the workpiece 102. The track assembly 110 includes a pair of flexible beams 112, each beam 112 having an integrally-formed rack 180. As described more fully below, the integrally-formed racks 180 may provide improved position control of the carriage assembly 120, thereby improving the quality of manufacturing operations performed on the workpiece 102.

Figure 2:
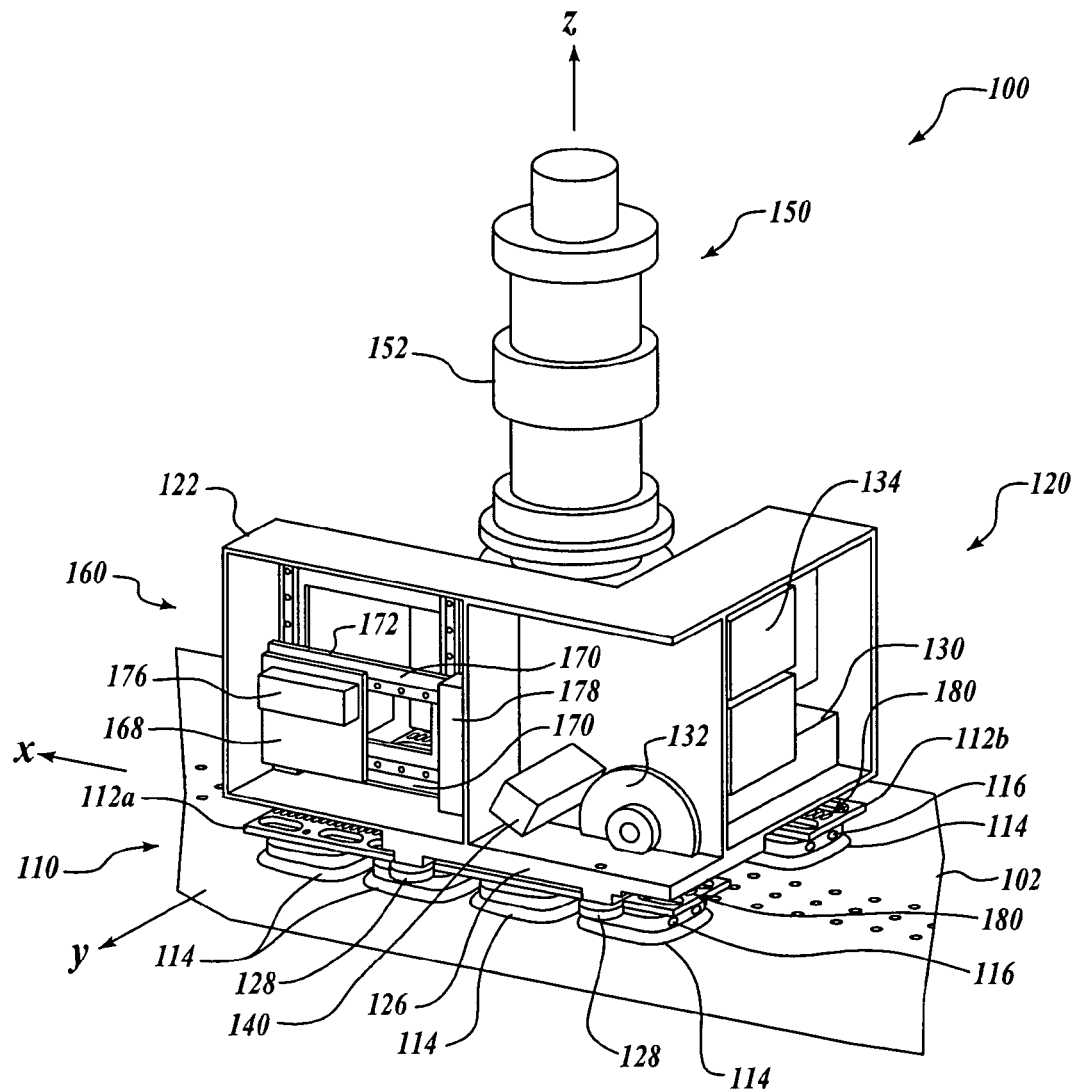
FIG. 2 is a rear isometric view of the manufacturing assembly of FIG. 1.

FIG. 2 is a rear isometric view of the manufacturing assembly 100 of FIG. 1. As shown in FIGS. 1 and 2, in this embodiment, each of the flexible beams 112 of the track assembly 110 is equipped with a plurality of vacuum cup assemblies 114. The vacuum cup assemblies 114 are fluidly coupled to one or more vacuum lines 116 leading to a vacuum source 118 (not shown), such as a vacuum pump or the like, such that vacuum may be controllably applied to (and removed from) the vacuum cup assemblies 114 during, for example, mounting, re-positioning, and removal of the track assembly 110 to and from the workpiece 102. The vacuum cup assemblies 114 are of known construction and may be of the type disclosed, for example, in U.S. Pat. No. 6,467,385 B1 issued to Buttrick et al., or U.S. Pat. No. 6,210,084 B1 issued to Banks et al. In alternate embodiments, the vacuum cup assemblies 114 may be replaced with other types of attachment assemblies, including magnetic attachment assemblies, bolts or other threaded attachment members, or any other suitable attachment assemblies.

With continued reference to FIGS. 1 and 2, the carriage assembly 120 includes an x-axis (or first) carriage 122 and a y-axis (or second) carriage 124. The x-axis carriage 122 includes a base member 126 having a plurality of rollers 128 that rollably engage the edges of the beams 112. Thus, the x-axis carriage 122 may translate back and forth along the length of the beams 112 along an x-axis that is aligned with the longitudinal axes of the beams 112. In alternate embodiments, the rollers 128 may be replaced with carriage bearings, gears, slide members, rubber wheels, or other suitable coupling devices. As shown in FIG. 2, the x-axis carriage 122 further includes a first drive motor 130 that is operatively coupled to a first gear 132. A controller 134 is positioned on the x-axis carriage 122 and is operatively coupled to the first drive motor 130. In this embodiment, the first drive gear 132 projects through the base member 126 and engages with the rack 180 that is integrally-formed in one of the beams 112a. The carriage assembly 120 may be driven along the track assembly 110 solely by the first drive gear 132, or alternately, a second drive gear 133 (not shown) may be coupled to the drive motor 130 and may operatively engage the integrally-formed rack 180 of the other beam 112b. The engagement of the first drive gear 132 with the rack 180 is described more fully below with reference to FIGS. 3-6.

Similarly, the y-axis carriage 124 includes a support member 136 slideably coupled to a slot 138 disposed in the base member 126 of the x-axis carriage 122 (FIG. 1). A second drive motor 140 is attached to the x-axis carriage 122 and to the support member 136, and is also operatively coupled to the controller 134. As shown in FIG. 1, in this embodiment, the second drive motor 140 drives a shaft (or screw) 142 that engages a ball nut 144 coupled to the support member 136. Thus, the second drive motor 140 may drive the support member 136 of the y-axis carriage 124 along a y-axis oriented transversely to the x-axis.

Figure 3:
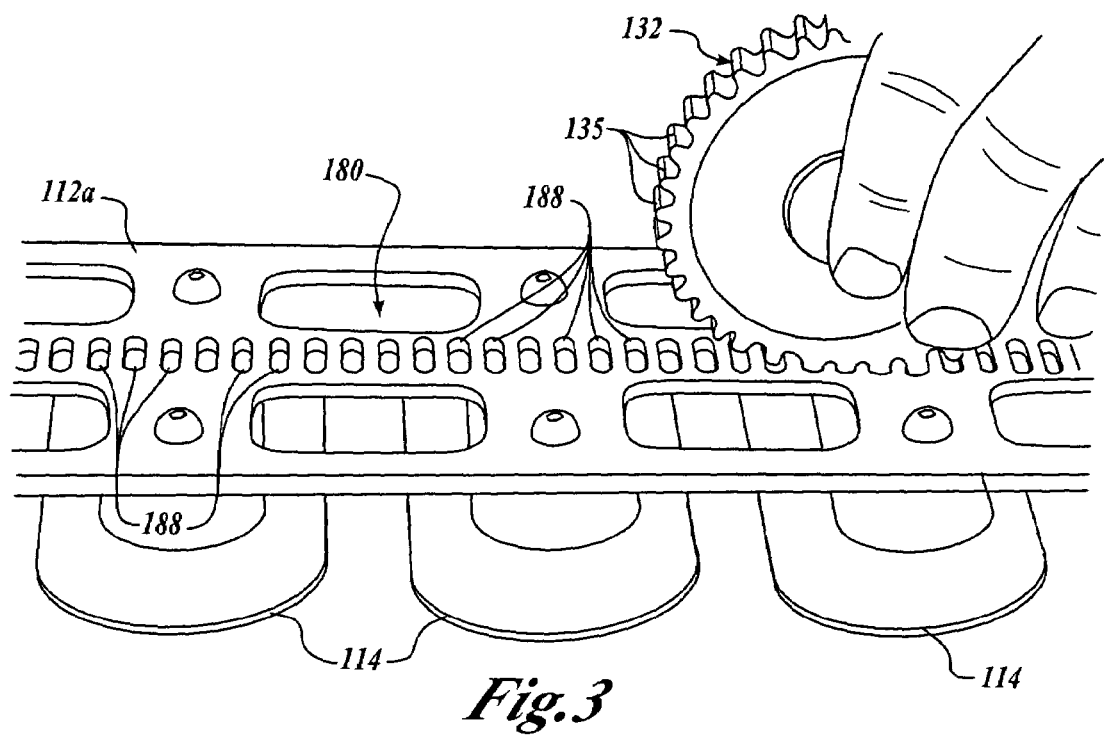
FIG. 3 is an enlarged upper isometric view of a first drive gear engaged with the integrally-formed rack of the rail of FIG. 1.
Figure 4:
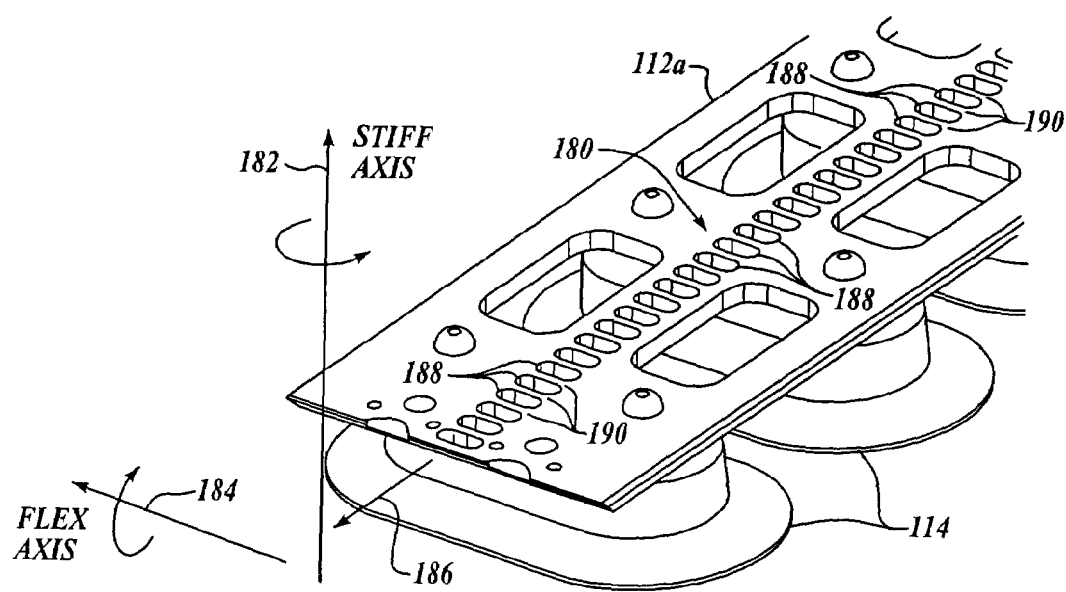
FIG. 4 is an enlarged partial isometric view of a rail of the track assembly of FIG. 1.
Figure 5:
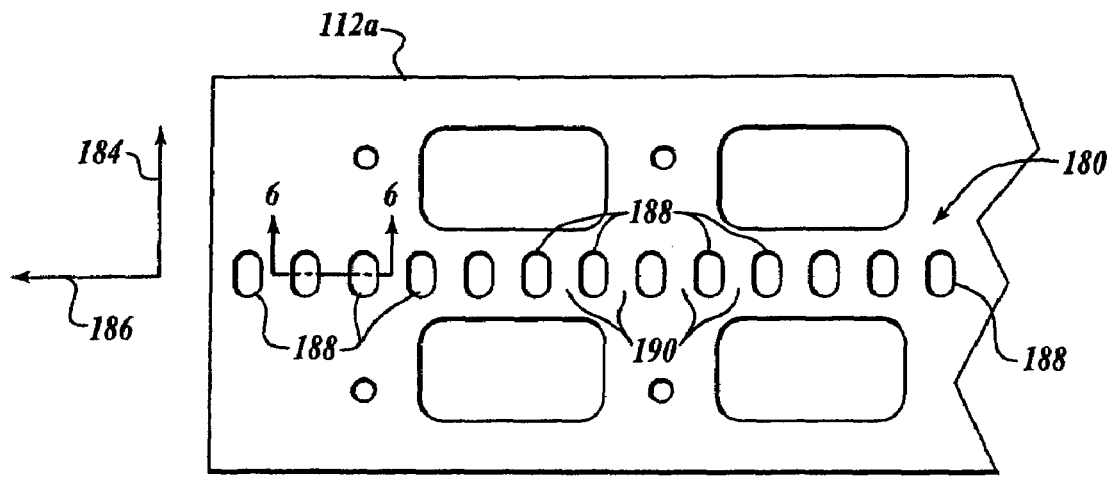
FIG. 5 is an enlarged, top elevational partial view of the rail of FIG. 1.

FIG. 3 is an enlarged upper isometric view of the first drive gear 132 of the carriage assembly 120 engaged with the integrally-formed rack 180 of the rail 112a of FIG. 1. FIGS. 4 and 5 are enlarged, partial isometric and top elevational views, respectively, of the rail 112a of FIG. 1. In the embodiment shown in FIGS. 3-5, the rail 112a has a width substantially greater than its thickness, such that it is substantially stiffer in bending about a stiff axis 182 that extends in the thickness direction than it is about a flex axis 184 that extends in the width direction. A neutral axis 186 extends longitudinally along a central, longitudinal axis of each rail 112. The rails 112a, 112b may be oriented approximately parallel to each other (FIG. 1), although the lateral spacing between the rails 112 can vary when the rails 112 are mounted on a compound-contoured workpiece 102. The widths of the rails 112 may preferably extend substantially parallel to the surface of the workpiece 102 when the vacuum cup assemblies 114 are attached to the workpiece surface 102. Because each rail 112 may bend relatively easily about its flex axis 184 and twist about its neutral axis 186, the rails 112 may flex and twist as needed to substantially follow the surface of the workpiece 102, and the vacuum cup assemblies 114 may maintain each rail 112 at a substantially constant distance from the surface of the workpiece 102. In this manner, the major surfaces of the rails 112 may be substantially perpendicular to the surface normal of the workpiece 102 at any point along each rail 112.

As further shown in FIGS. 3-5, the rack 180 includes a plurality of apertures 188 integrally-formed in the rail 112a along the neutral axis 186 of the rail 112a. In other words, a pitch line of the rack 180 extends along and at least approximately coincides with the neutral axis 186 of the rail 112. Bridges 190 are formed between each pair of successive apertures 188. As best shown in FIG. 3, the teeth 135 of the first drive gear 132 are engaged at least partially into the apertures 188 and against the bridges 190 of the rack 180.

Figure 6:
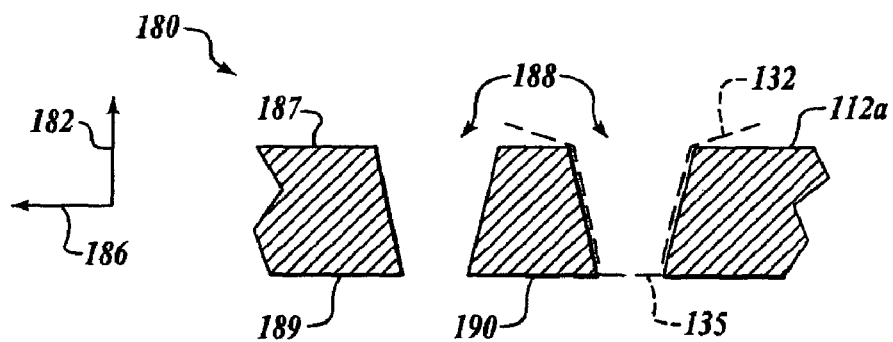
FIG. 6 is an enlarged, side cross-sectional view of a portion of the rail taken along line 6-6 of FIG. 5.
Figure 7:
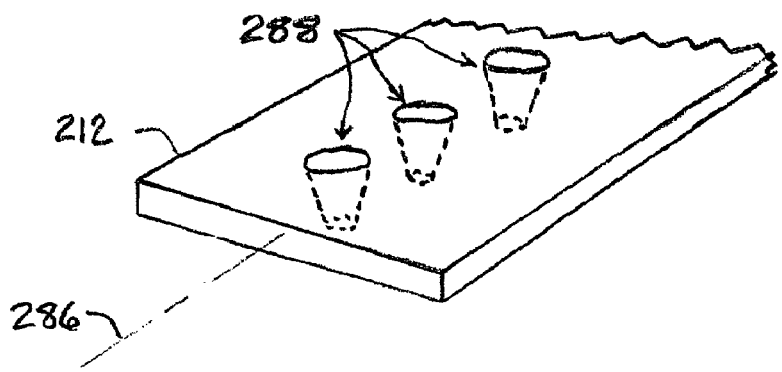
FIG. 7 is an enlarged, partial isometric view of a rail having conically-shaped apertures in accordance with an alternate embodiment of the invention.

FIG. 6 is an enlarged, side cross-sectional view of a portion of the rail 112a taken along line 6-6 of FIG. 5. As shown in FIG. 6, in this embodiment, the apertures 188 are tapered along the stiff axis 182 (FIG. 6) such that the apertures 188 are wider at a top surface 187 of the rail 112a and narrower at a bottom surface 189 of the rail 112a. In one aspect, the apertures 188 are tapered in a wedge-shaped (or two-dimensional) manner. In an alternate aspect, the apertures 188 are at least partially conically (or three-dimensionally) shaped. For example, FIG. 7 shows a rail 212 having conically-shaped apertures 288 distributed along a neutral axis 286 in accordance with an alternate embodiment of the invention. As further shown in FIG. 6, the apertures 188 may be tapered to closely match the profile of the teeth 135 of the drive gear 132. In one particular embodiment, the thickness of the rail 112 is equal to the length of the tooth 135 of the drive gear 132 (FIG. 6). Because the pitch line of the rack 180 at least approximately coincides with the neutral axis 186, the rack 180 remains aligned along the neutral axis 186 during bending and flexing of the rail 112a over the workpiece 102. Thus, the teeth 135 of the drive gear 132 may remain more positively engaged with the rack 180 as the carriage assembly 120 is driven over the track assembly 110, even when the rails 112 are twisted and flexed over contoured surfaces.

It will be appreciated that the rack 180 may be integrally-formed with the rail 112 using any desired manufacturing techniques. For example, the rack 180 may be formed in the rail 112 after the rail 112 has been formed, such as by milling, drilling, hogging, or using any other suitable methods. Alternately, the rack 180 may be formed simultaneously with the formation of the rail 112, such as by casting, stamping, or pressing.

As best shown in FIG. 1, the tool assembly 150 is coupled to the support member 136 of the y-axis carriage 124 and may be operatively coupled to the controller 134. In this embodiment, the tool assembly 150 includes a drill spindle module 152 that is controllably engageable with the workpiece 102 along a z-axis which is approximately aligned with a local normal to the workpiece 102. The drill spindle module 152 may be any known drilling device suitable for performing drilling operations, including, for example, those drilling devices commercially-available from Recoules, S.A. of Ozoir-la-Ferriere, France, or from Global Industrial Technologies, Inc. of Dallas, Tex. It may be appreciated that, in alternate embodiments, the tool assembly 150 may be any of a wide variety of manufacturing tools, and that the teachings of the present invention are not limited simply to manufacturing operations that involve drilling. For example, manufacturing assemblies in accordance with the present invention may be used in conjunction with riveters, mechanical and electromagnetic dent pullers, welders, wrenches, clamps, sanders, nailers, screw guns, or virtually any other desired type of manufacturing tools or measuring instruments.

With continued reference to FIGS. 1 and 2, in this embodiment, the opposing-force support assembly 160 includes a clamp-up actuator 162 having a clamp-up pin 164 that is engageable with the workpiece 102. A first (or y-axis) actuator 166 is coupled to the clamp-up actuator 162 and to a first baseplate 168, and is extendible along the y-axis. The first baseplate 168 is slideably coupled to a second baseplate 172, permitting the first baseplate 168 to be translated along the x-axis. Similarly, the second baseplate 172 is slideably coupled to the x-axis carriage 122, permitting the second baseplate 172 to be translated along the z-axis. A second (or x-axis) actuator 176 is coupled between the first baseplate 168 and the second baseplate 172, and is extendible along the x-axis. A third (or z-axis) actuator 178 is coupled between the second baseplate 172 and to the x-axis carriage 122, and is extendible along the z-axis. The first, second, and third actuators 166, 176, 178 may be operatively coupled to the controller 134. Thus, the first, second, and third actuators 166, 176, 178 may be used to controllably position the clamp-up pin 164 of the opposing-force support assembly 160 at a desired location along the y-axis, the x-axis, and the z-axis, respectively.

It will be appreciated that the clamp-up actuator 162 may be any type of suitable actuator, including a hydraulic, pneumatic, or electrically-driven actuator. Similarly, the first, second and third actuators 166, 176, 178 may be hydraulic, pneumatic, electric, or any other suitable type of actuators. In one particular embodiment, the first, second and third actuators 166, 176, 178 are so-called "return to home" pneumatic actuators that are coupled by one or more pneumatic supply lines 179 to a source of pressurized air (not shown).

Similarly, it will be appreciated that a wide variety of suitable embodiments of opposing support assemblies 160 may be conceived in accordance with the teachings of the present invention, including, for example, a collet device of the type generally disclosed in U.S. Pat. No. 4,396,318 issued to Jensen et al., U.S. Pat. No. 5,395,187 issued to Slesinski et al., and U.S. Pat. No. 6,036,409 issued to Rissler, or a clamping device of the type generally disclosed in U.S. Pat. No. 5,482,411 issued to McGlasson and U.S. Pat. No. 6,283,684 B1 issued to Jarvis. In one alternate embodiment, the hole 103 may be a threaded hole 103, and the clamp-up pin 164 may be a threaded member that threadedly engages the threaded hole 103. In further embodiments, the clamp-up pin 164 and clamp-up actuator 162 may be replaced with any other suitable securing devices, including one or more of the above-referenced vacuum cup assemblies 114, magnets, or other electro-magnetic apparatus, such as, for example, an apparatus that exerts a force on a workpiece in a manner similar to the electromagnetic dent remover apparatus commercially-available from Electroimpact, Inc. of Everett, Wash.

In operation, the manufacturing assembly 100 may be mounted onto the workpiece 102 and vacuum may be provided to the vacuum assemblies 114, thereby securing the track assembly 110 in a desired position. The carriage assembly 120 may then be moved to a desired position along the track assembly 110, so that the tool assembly 150 may be used to perform manufacturing operations on the workpiece 102. The controller 134 may transmit control signals to the first drive motor 130, rotating the first drive gear 132 which engages with the integrally-formed rack 180 in the rail 112a. As best shown in FIG. 6, the teeth 135 of the first drive gear 132 may engaged partially or fully into the apertures 188 and may exert a driving force against the bridges 190 of the rack 180, thereby driving the carriage assembly 120 along the rails 112 until the carriage assembly 120 reaches the desired position.

It may be appreciated that the positioning of the carriage assembly 120 on the track assembly 110, and the positioning and engagement of the opposing-force support assembly 160 and the tool assembly 15Q with respect to the workpiece 102 may be accomplished in an automated or semi-automated manner using the controller 134 equipped with conventional, computerized numerically-controlled (CNC) methods and algorithms. Alternately, the positioning may be performed manually or partially-manually by an operator, such as, for example, by having the operator provide manual control inputs to the controller 134, or by temporarily disabling or neutralizing the above-referenced motors and actuators of the carriage and clamp-up assemblies 120, 160 to permit manual movement.

Next, the clamp-up pin 164 may be positioned in a hole 103, and the clamp-up actuator 162 may be actuated, to securely engage the clamp-up pin 164 within the hole 103, thereby fixing the position of the opposing-force support assembly 160 with respect to the workpiece 102. The tool assembly 150 may then be employed to perform manufacturing operations on the workpiece 102. Specifically, in the embodiment shown in FIGS. 1-2, the drill spindle module 152 may be operated to drill one or more additional holes 103 into the workpiece 102. Like the carriage assembly 120, the tool assembly 150 may be controlled and operated in an automated or semi-automated manner using the controller 134 and conventional CNC methods and algorithms.

Manufacturing assemblies having integrally-formed racks in accordance with the teachings of the present invention may advantageously improve the quality of manufacturing operations on a workpiece. Because the rack 180 is integrally-formed with the rail 112 with the pitch line of the rack 180 at least approximately aligned with the neutral axis 186 of the rail 112, the teeth 135 of the drive gear 132 remain in positive engagement with the rack 180 even when the rail 112 is flexed and twisted over contoured surfaces. The integrally-formed rack 180 may advantageously permit more accurate positioning of the carriage assembly 120 on the track assembly 110, and thus, more accurate positioning of the tool assembly 150 over the workpiece 102. The manufacturing assembly 100 may therefore provide improved accuracy and consistency of manufacturing operations in comparison with prior art manufacturing assemblies. Because the manufacturing operations may be more accurately and consistently performed, the costs associated with inspecting and reworking the workpiece 102 during the manufacturing operation may be reduced.

The manufacturing assembly 100 having the track assembly 110 in accordance with the invention may also improve the speed with which manufacturing operations may be performed. Because the integrally-formed rack 180 of the track assembly 110 may provide improved position control of the tool assembly 150 during manufacturing operations, the tool assembly 150 may be positioned and operated with relatively fewer delays for position checking and position adjustment, and the need for repair and rework of the manufacturing operations (e.g. hole reworking etc.) may be reduced. In this way, the speed with which the manufacturing operations are performed may be increased, and the efficiency and throughput of the manufacturing operations may be improved.

It will be appreciated that manufacturing assemblies in accordance with the present invention, including the particular embodiment of the manufacturing assembly 100 described above, may be used to provide opposing support to a wide variety of manufacturing tools, and that the teachings of the present invention are not limited simply to manufacturing operations that involve drilling. For example, manufacturing assemblies having opposing support assemblies in accordance with the present invention may be used to support riveters, mechanical and electromagnetic dent pullers, welders, Wrenches, clamps, sanders, nailers, screw guns, routers, degreasers, washers, etchers, deburring tools, lasers, tape applicators, or virtually any other desired type of manufacturing tools or measuring instruments.

It may also be appreciated that a variety of alternate embodiments of apparatus and methods may be conceived in accordance with the present invention, and that the invention is not limited to the particular apparatus and methods described above and shown in the accompanying figures. For example, it may be noted that the carriage assembly 120 and the track assembly 110 may assume a wide variety of alternate embodiments. For example, in alternate embodiments, an integrally-formed rack 180 in accordance with the present disclosure may be used in combination with any of the carriage assemblies and track assemblies disclosed in co-pending, commonly owned U.S. patent application Ser. No. 10/016,524, which application is incorporated herein by reference.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. An apparatus for supporting a manufacturing tool relative to a workpiece, the apparatus comprising:
   a track assembly having a plurality of attachment devices configured to be attached to the workpiece and including at least one rail, the rail including an elongated, substantially smooth surface having a longitudinally-extending neutral axis and a rack extending along a pitch line that at least approximately coincides with the longitudinally-extending neutral axis, wherein the rack comprises a plurality of tapered apertures disposed within the substantially smooth surface, the plurality of tapered apertures being uniformly spaced along the longitudinally-extending neutral axis of the rack, the plurality of attachment devices coupled to the at least one rail such that the plurality of attachment devices are distributed along the longitudinally-extending neutral axis and disposed directly between the at least one rail and the workpiece when the track assembly is engaged to the workpiece;
   a carriage comprising an x-axis portion moveably coupled to the track assembly and moveable relative to the workpiece along the rail, the carriage including a drive gear having a plurality of drive teeth, the plurality of tapered apertures being configured and spaced to fittingly receive one or more of the plurality of drive teeth as the drive gear rollably engages the rack, the carriage further comprising a y-axis portion slideably coupled to the x-axis portion and moveable with respect to the x-axis portion along a y-axis oriented transversely to the longitudinally-extending neutral axis, the y-axis being approximately co-planar with the substantially smooth surface of the rail of the track assembly, and the carriage further comprising a tool support configured to receive and support a manufacturing tool; and
   an opposing-force support assembly moveable along the y-axis independent from the tool support, the opposing-force support assembly coupled to the carriage and securable to the workpiece.

2. The apparatus of claim 1, wherein the rack is integrally-formed in the rail.

3. The apparatus of claim 1, wherein the tapered apertures include a plurality of wedge shaped apertures.

4. The apparatus of claim 1, wherein the tapered apertures include a plurality of conically-shaped apertures.

5. The apparatus of claim 1, wherein the rail comprises a substantially flat member having a width substantially greater than a thickness of the substantially flat member, the substantially flat member being substantially stiffer in bending about a stiff axis that extends in a first direction aligned along the thickness of the substantially flat member, and being substantially more flexible in bending about a bending axis that extends in a second direction aligned along the width of the substantially flat member.

6. The apparatus of claim 1, wherein the at least one rail comprises a first rail and a second rail oriented approximate parallel to the first rail, the first and second rails each having a longitudinally-extending neutral axis and a rack, the rack extending along a pitch line that at least approximately coincides with the longitudinally-extending neutral axis.

7. The apparatus of claim 1, wherein the track assembly includes:
   first and second elongate flexible rails, the rails being spaced apart and approximately parallel to each other; and wherein the plurality of attachment devices are connected to each rail and spaced at intervals therealong for releasably attaching each rail to the surface of the workpiece by vacuum, with the widths of the rails extending substantially parallel to the surface of the workpiece, the rails bending and twisting as needed to substantially follow the surface of the workpiece.

8. The apparatus of claim 7, wherein each rail is relatively stiff in bending about a first bending axis and relatively flexible in bending about a second bending axis orthogonal to the first bending axis, and wherein each rail is mounted on the workpiece such that the first bending axis is substantially normal to the workpiece surface and the second bending axis is substantially parallel to the workpiece surface.

9. The apparatus of claim 1, wherein the opposing-force support assembly comprises a y-axis actuator such that the opposing-force support is moveable in the y-axis via the y-axis actuator.

10. The apparatus of claim 1, wherein the carriage includes a drive assembly configured to drive the carriage along the track assembly and having a drive motor coupled to the drive gear.

11. The apparatus of claim 1 wherein the carriage includes a drive assembly configured to drive the carriage along the track assembly and having a drive motor coupled to the drive gear, the apertures being configured to match a cross-sectional profile of the teeth.

12. The apparatus of claim 1, wherein the opposing-force support assembly is securable to the workpiece via a clamp-up pin, the opposing-force support assembly comprising a y-axis actuator such that the opposing-force support is moveable in the y-axis via the y-axis actuator.

13. An assembly for performing a manufacturing operation on a workpiece, the assembly comprising:
- a track assembly having a plurality of attachment devices configured to be attached to the workpiece and including a plurality of rails, the rails being spaced apart and oriented approximately parallel, each rail including an elongated, substantially smooth surface having a longitudinally-extending neutral axis, and at least one rail having a rack extending along a pitch line that at least approximately coincides with the longitudinally-extending neutral axis, wherein the rack comprises a plurality of tapered apertures disposed within the substantially smooth surface of the at least one rail, the plurality of tapered apertures being uniformly spaced along the longitudinally-extending neutral axis of the rack, the plurality of attachment devices being coupled to the plurality of rails such that the plurality of attachment devices are distributed along the longitudinally-extending neutral axis and disposed directly between the plurality of rails and the workpiece when the track assembly is engaged to the workpiece;
- a carriage comprising an x-axis portion moveably coupled to the track assembly and moveable relative to the workpiece along the rails, the carriage including a drive gear having a plurality of drive teeth, the plurality of tapered apertures being configured and spaced to fittingly receive one or more of the plurality of drive teeth as the drive gear rollably engages the rack, the carriage further comprising a y-axis portion slideably coupled to the x-axis portion and moveable with respect to the x-axis portion along a y-axis oriented transversely to the longitudinally-extending neutral axis, the y-axis being approximately co-planar with the substantially smooth surface of the at least one rail of the track assembly, the carriage including a tool support adapted to receive and support a manufacturing tool;
- a manufacturing tool coupled to the tool support and configured to be engageable with the workpiece to perform the manufacturing operation on the workpiece; and
- an opposing-force support assembly moveable along the y-axis independent from the tool support, the opposing-force support assembly coupled to the carriage and securable to the workpiece to at least partially counterbalance a manufacturing force exerted on the workpiece by the manufacturing tool.

14. The assembly of claim 13, wherein the at least one rack is integrally-formed in the at least one rail.

15. The assembly of claim 13, wherein the tapered apertures includes a plurality of wedge-shaped apertures.

16. The assembly of claim 13, wherein the tapered apertures includes a plurality of conically-shaped apertures.

17. The assembly of claim 13, wherein each of the rails comprises a substantially flat member having a width substantially greater than a thickness of the substantially flat member, the substantially flat member being substantially stiffer in bending about a stiff axis that extends in a first direction aligned along the thickness of the substantially flat member, and being substantially more flexible in bending about a bending axis that extends in a second direction aligned along the width of the substantially flat member.

18. The assembly of claim 13, wherein the plurality of rails comprises a first rail and a second rail.

19. The assembly of claim 13, wherein the plurality of vacuum attachment devices are connected to each rail and spaced at intervals therealong for releasably attaching each rail to the surface of the workpiece by vacuum, with the widths of the rails extending substantially parallel to the surface of the workpiece, the rails bending and twisting as needed to substantially follow the surface of the workpiece.

20. The assembly of claim 19, wherein each rail is relatively stiff in bending about a first bending axis and relatively flexible in bending about a second bending axis orthogonal to the first bending axis, and wherein each rail is mounted on the workpiece such that the first bending axis is substantially normal to the workpiece surface and the second bending axis is substantially parallel to the workpiece surface.

21. The assembly of claim 13, wherein the carriage includes a drive assembly adapted to drive the carriage along the track assembly and having a drive motor coupled to a drive gear, the drive gear operatively engaging the rack.

22. The assembly of claim 13, wherein the rack includes a plurality of apertures and wherein the carriage includes a drive assembly adapted to drive the carriage along the track assembly and having a drive motor coupled to a drive gear, the drive gear having a plurality of teeth, at least some of the teeth operatively engaging the apertures of the rack, the apertures being adapted to match a cross-sectional profile of the teeth.

23. The assembly of claim 13, wherein the opposing-force support assembly comprises a y-axis actuator such that the opposing-force support is moveable in the y-axis via the y-axis actuator.

24. The assembly of claim 13, wherein the manufacturing tool includes a drill and the manufacturing operation includes a drilling operation.

25. A method of performing a manufacturing operation on a workpiece, the method comprising:
- attaching a track assembly to the workpiece with a plurality of vacuum attachment devices, the track assembly including at least one rail including an elongated, substantially smooth surface having a longitudinally-extending neutral axis and a rack extending along a pitch line that at least approximately coincides with the longitudinally-extending neutral axis, wherein the rack comprises a plurality of tapered apertures disposed within the substantially smooth surface, the plurality of tapered apertures being uniformly spaced along the longitudinally-extending neutral axis of the rack, the plurality of attachment devices being coupled to the at least one rail such that the plurality of attachment devices are distributed along the longitudinally-extending neutral axis and disposed directly between the at least one rail and the workpiece when the track assembly is engaged to the workpiece;
- moveably coupling a carriage to the track assembly, the carriage comprising an x-axis portion moveable relative to the workpiece along the rails, the x-axis portion including a drive gear having a plurality of drive teeth, the plurality of tapered apertures being configured and spaced to fittingly receive one or more of the plurality of drive teeth as the drive gear rollably engages the rack;
- slideably coupling a y-axis portion to the x-axis portion of the carriage, wherein the y-axis portion is moveable with respect to the x-axis portion along a y-axis oriented transversely to the longitudinally-extending neutral axis, the y-axis being approximately co-planar with the substantially smooth surface of the rail of the track assembly;
- moveably supporting a manufacturing tool on the carriage;
- engaging a drive apparatus with the drive gear;

driving the carriage supporting the manufacturing tool along the track assembly using the drive apparatus; and applying an opposing force against the workpiece using an opposing-force support assembly, the opposing-force support assembly comprising a y-axis actuator extendible along the y-axis, an x-axis actuator extendible along the x-axis, and a z-axis actuator extendible along the z-axis.

26. The method of claim 25, wherein attaching a track assembly to the workpiece includes applying a suction force against the workpiece with the track assembly.

27. The method of claim 25, wherein attaching a track assembly to the workpiece includes attaching a track assembly having at least one rail that includes a rack integrally-formed in the rail.

28. The method of claim 25, wherein attaching a track assembly to the workpiece includes attaching a track assembly having at least one rail that includes a rack, wherein the rack comprises a plurality of wedge-shaped apertures.

29. The method of claim 25, wherein attaching a track assembly to the workpiece includes attaching a track assembly having at least one rail that includes a rack, wherein the rack comprises a plurality of conically-shaped apertures.

30. The method of claim 25, wherein attaching a track assembly to the workpiece includes attaching a track assembly having at least one rail, wherein the rail comprises a substantially flat member having a width substantially greater than a thickness of the substantially flat member, the substantially flat member being substantially stiffer in bending about a stiff axis that extends in a first direction aligned along the thickness of the substantially flat member, and being substantially more flexible in bending about a bending axis that extends in a second direction aligned along the width of the substantially flat member.

31. The method of claim 25, wherein moveably supporting a manufacturing tool on the carriage includes providing a tool support adapted to receive and support a manufacturing tool on the carriage.

32. The method of claim 25, wherein engaging a drive apparatus with the rack includes providing the carriage with a drive assembly adapted to drive the carriage along the track assembly and having a drive motor coupled to a drive gear, the drive gear operatively engaging the rack.

33. The method of claim 25, wherein engaging a drive apparatus with the rack includes engaging at least one tooth with at least one aperture, the aperture being adapted to match a cross-sectional profile of the tooth.

34. The method of claim 25, further comprising performing a manufacturing operation on the workpiece using the manufacturing tool.

35. The method of claim 34, wherein performing a manufacturing operation includes performing a drilling operation.

36. The method of claim 25, wherein the applying the opposing force against the workpiece includes using a vacuum cup assembly to securably engage the worpiece.

37. Te method of claim 25, further comprising simultaneously with applying an opposing force, performing a manufacturing operation on the workpiece using the manufacturing tool.

38. An assembly for performing a manufacturing operation on a workpiece, the assembly comprising:

a track assembly having plurality of attachment devices attachable to the workpiece and including a plurality of rails, the plurality of rails being spaced apart and oriented approximately parallel, each rail including an elongated, substantially smooth surface having a longitudinally-extending neutral axis and a rack extending along a pitch line that at least approximately coincides with the longitudinally-extending neutral axis, wherein the rack includes a plurality of apertures disposed within the substantially smooth surface, the plurality of apertures being uniformly spaced along the longitudinally-extending neutral axis of the rack, the plurality of attachment devices coupled to the plurality of rails such that the plurality of attachment devices are distributed along the longitudinally-extending neutral axis and disposed directly between the plurality of rails and the workpiece when the track assembly is engaged to the workpiece;

a carriage comprising an x-axis portion moveably coupled to the track assembly and moveable relative to the workpiece along the rails, the carriage including a drive gear having a plurality of drive teeth, the plurality of tapered apertures being configured and spaced to fittingly receive one or more of the plurality of drive teeth as the drive gear rollably engages the rack, the carriage further comprising a y-axis portion slideably coupled to the x-axis portion and moveable with respect to the x-axis portion along a y-axis oriented transversely to the longitudinally-extending neutral axis, the y-axis being approximately co-planar with the substantially smooth surface of the rail of the longitudinally-extending neutral axis, the y-axis being approximately co-planar with the substantially smooth surface of the rail of the track assembly;

the carriage including a manufacturing tool that performs the manufacturing operation on the workpiece, and a drive assembly having at least one rotatable drive gear that includes a plurality of outwardly-projecting teeth configured to fittingly engage the plurality of apertures as the drive gear is rotated, the drive gear moving the carriage along the track assembly as the drive gear is rotated;

a manufacturing tool coupled to the tool support, the manufacturing tool engageable with the workpiece to perform the manufacturing operation on the workpiece; and an opposing-force support assembly comprising a y-axis actuator extendible along the y-axis, an x-axis actuator extendible along the x-axis, and a z-axis actuator extendible along the z-axis.

39. The assembly of claim 38, wherein the plurality of apertures includes a plurality of tapered apertures.

40. The assembly of claim 38, wherein the plurality of apertures includes a plurality of apertures configured to match a cross-sectional profile of the teeth.

41. A method of performing a manufacturing operation on a workpiece, the method comprising:

attaching a track assembly to the workpiece using a plurality of attachment devices, the track assembly including a plurality of rails, the plurality of rails being spaced apart and oriented approximately parallel, each rail including an elongated, substantially smooth surface having a longitudinally-extending neutral axis and at least one rail having a rack extending along a pitch line that at least approximately coincides with its longitudinally-extending neutral axis, wherein the rack includes a plurality of apertures disposed within the substantially smooth surface, the plurality of apertures being uniformly spaced along the longitudinally-extending neutral axis of the rack, the plurality of attachment devices being coupled to the plurality of rails such that the plurality of attachment devices are distributed along the longitudinally-extending neutral axis and disposed directly between the plurality of rails and the workpiece when the track assembly is engaged to the workpiece;

moveably coupling a carriage to the track assembly, the carriage comprising an x-axis portion moveable relative to the workpiece along the rails, the x-axis portion including a drive gear having a plurality of drive teeth, the plurality of tapered apertures being configured and spaced to fittingly receive one or more of the plurality of drive teeth as the drive gear rollably engages the rack;

slideably coupling a y-axis portion to the x-axis portion of the carriage, wherein the y-axis portion is moveable with respect to the x-axis portion along a y-axis oriented transversely to the longitudinally-extending neutral axis, the y-axis being approximately co-planar with the substantially smooth surface of the rail of the track assembly;

moveably supporting a manufacturing tool on the carriage;

engaging a drive assembly with the rack, the drive assembly having at least one rotatable drive gear that includes a plurality of outwardly-projecting teeth configured to fittingly engage the plurality of apertures as the drive gear is rotated;

driving the carriage along the track assembly including rotating the drive gear; and applying an opposing force against the workpiece using an opposing-force support assembly, the opposing-force support assembly moveable along the y-axis independent from the manufacturing tool.

42. The method of claim 41, wherein attaching a track assembly to the workpiece includes attaching a track assembly to the workpiece, the track assembly including a plurality of rails, the rails being spaced apart and oriented approximately parallel, each rail having a longitudinally-extending neutral axis and at least one rail has a rack extending along a pitch line that at least approximately coincides with its longitudinally-extending neutral axis, wherein the rack includes a plurality of tapered apertures.

43. The method of claim 41, wherein attaching a track assembly to the workpiece includes attaching a track assembly to the workpiece, the track assembly including a plurality of rails, the rails being spaced apart and oriented approximately parallel, each rail having a longitudinally-extending neutral axis and at least one rail has a rack extending along a pitch line that at least approximately coincides with its longitudinally-extending neutral axis, wherein the rack includes a plurality of apertures configured to match a cross-sectional profile of the teeth.

* * * * *